US008669000B2

(12) United States Patent
Yoon

(10) Patent No.: US 8,669,000 B2
(45) Date of Patent: Mar. 11, 2014

(54) BATTERY PACK

(75) Inventor: Ji-Hyoung Yoon, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 799 days.

(21) Appl. No.: 12/801,739

(22) Filed: Jun. 23, 2010

(65) Prior Publication Data

US 2011/0151308 A1 Jun. 23, 2011

(30) Foreign Application Priority Data

Dec. 22, 2009 (KR) .................. 10-2009-0129129

(51) Int. Cl.
*H01M 2/10* (2006.01)
(52) U.S. Cl.
USPC .............................. 429/99; 429/156; 429/159
(58) Field of Classification Search
USPC .......... 429/96–100, 121–347; 220/23.4, 23.2, 220/23.83, 4.02, 3.9, 3.92, 3.94, 622, 614, 220/610, 328, 327, 315
See application file for complete search history.

(56) References Cited

U.S. PATENT DOCUMENTS

| 6,899,975 | B2 * | 5/2005 | Watanabe et al. ............. 429/156 |
| 2003/0003350 | A1 * | 1/2003 | Heimer et al. .................. 429/99 |
| 2006/0172183 | A1 * | 8/2006 | Chen et al. ...................... 429/97 |

FOREIGN PATENT DOCUMENTS

JP 2009-283193 A 12/2009

OTHER PUBLICATIONS

Korean Notice of Allowance in KR 10-2009-0129129, dated Aug. 20, 2011 (Yoon).

* cited by examiner

*Primary Examiner* — Basia Ridley
*Assistant Examiner* — James Lee
(74) *Attorney, Agent, or Firm* — Lee & Morse, P.C.

(57) ABSTRACT

A battery pack including a plurality of battery modules, each battery module including a plurality of stacked unit battery cells; a frame supporting the plurality of battery modules; and a plurality of elastic coupling members for elastically connecting at least one battery module to another battery module or for elastically connecting at least one of the battery modules to the frame; wherein elastic coupling members connected to one of the battery modules have a different elastic coefficient from elastic coupling members connected to the other battery module.

14 Claims, 16 Drawing Sheets

FIG. 9C
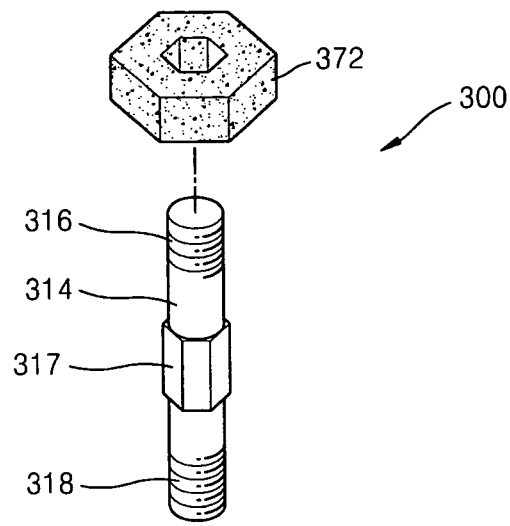
FIG. 10
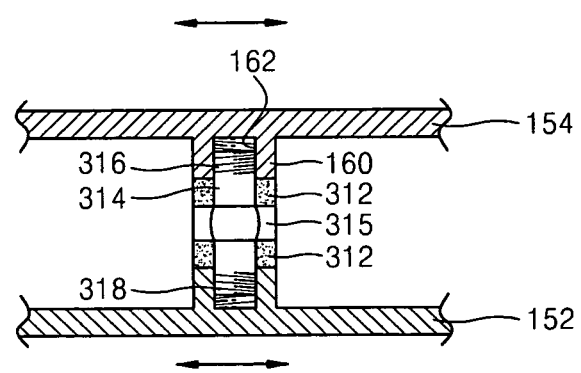
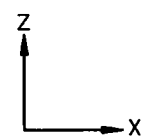

BATTERY PACK

BACKGROUND

1. Field

Embodiments relate to a battery pack.

2. Description of the Related Art

Secondary batteries, i.e., rechargeable batteries, may be charged and discharged repeatedly, unlike primary batteries. Secondary batteries are widely used in electronic devices, e.g., cellular phones, notebook computers, and camcorders. Recently, secondary batteries have been used as batteries for, e.g., electric bicycles, electric scooters, electric cars, and hybrid electric vehicles (HEV).

A secondary battery may include an electrode assembly and an electrolyte. The electrode assembly may include a positive electrode plate, a negative electrode plate, and a separator. The electrolyte may include lithium ions. The electrode assembly and the electrolyte may be received in a case to form a unit battery cell of the secondary battery.

When unit battery cells are stacked in horizontal or vertical direction, a battery module is formed. In addition, a plurality of battery modules may be stacked in the horizontal or vertical direction to form a battery pack.

A battery pack may be used in environments where there are a lot of vibrations. In particular, when a battery pack is used in an electric bicycle, an electric scooter, an electric car, or an HEV, the battery pack may be greatly affected by vibrations. When a secondary battery is exposed to vibrations, performance thereof may degrade or the lifespan of the secondary battery may be reduced due to being physically damaged.

In particular, when battery modules are fixedly coupled to an electric car, for example, each of the battery modules may receive vibrations from the electric car.

Accordingly, the battery modules may be coupled to each other using coupling members having elasticity. However, when elastic coefficients of the coupling members coupled to the battery modules are similar to each other, the battery modules may have similar natural resonant frequencies. Thus, the battery modules may be simultaneously resonated due to vibrations at a certain frequency.

SUMMARY

Embodiments are directed to a battery pack, which represents advances over the related art.

It is a feature of an embodiment to provide a battery pack, which is formed by stacking a plurality of battery modules each including a plurality of unit battery cells, the battery pack being capable of preventing the battery modules from resonating simultaneously due to vibrations at a certain frequency.

At least one of the above and other features and advantages may be realized by providing a battery pack including a plurality of battery modules, each battery module including a plurality of stacked unit battery cells; a frame supporting the plurality of battery modules; and a plurality of elastic coupling members for elastically connecting at least one battery module to another battery module or for elastically connecting at least one of the battery modules to the frame; wherein elastic coupling members connected to one of the battery modules have a different elastic coefficient from elastic coupling members connected to the other battery module.

The battery modules may be coupled to each other by the elastic coupling members and at least one of the battery modules may be coupled to the frame by the elastic coupling members.

Each battery module may be coupled to other battery modules and coupled to the frame by the elastic coupling members.

Each of the elastic coupling members may include an elastic body for providing elasticity; and a retention unit for preventing the elastic body from being moved.

The elastic body may be composed of rubber.

The retention unit may include a coupling member, the coupling member being inserted in the elastic body and connecting the battery modules to each other and connecting at least one battery module to the frame.

The coupling member may include screw threads on end portions thereof, and the battery modules and the frame may include screw recesses for coupling engagement with the coupling member.

The coupling members may be coupled to flange portions of the battery modules to couple the battery modules to each other, and the elastic body may be disposed between flange portions of adjacent battery modules.

The elastic coupling members may have different elastic coefficients from each other and may have at least a cross-sectional shape, a thickness of the elastic body, or an elastic material of the elastic body, different from the other elastic coupling members.

The elastic body may have an opened portion at a side for sideways insertion onto the coupling member.

The coupling member may be coupled to the battery modules or the frame by screw threads, and may have a bolt head protruding along a circumference thereof.

The elastic body may be disposed on at least one side of the bolt head.

Each of the battery modules may be coupled to the frame by the elastic coupling members.

The frame may include a plurality of defined spaces, and the battery modules may be disposed in each of the defined spaces.

The elastic coupling member may include an elastic body for providing elasticity; and a retention unit for preventing the elastic body from being moved.

BRIEF DESCRIPTION OF THE DRAWINGS

The above and other features and advantages will become more apparent to those of ordinary skill in the art by describing in detail exemplary embodiments with reference to the attached drawings, in which:

FIG. 9C illustrates an exploded perspective view of another example of an elastic coupling member;

FIG. 10 illustrates a schematic cross-sectional view of an elastic coupling member in a coupled state according to an embodiment;

DETAILED DESCRIPTION

Figure 1:
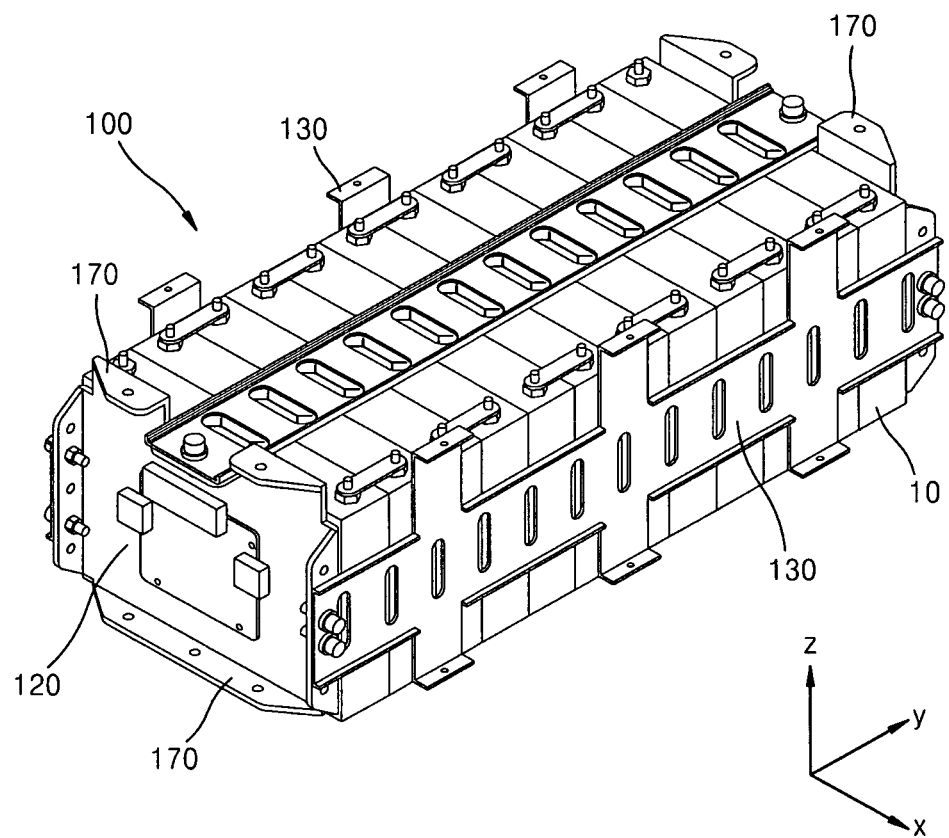
FIG. 1 illustrates a schematic perspective view of a battery module included in a battery pack according to an embodiment.

Korean Patent Application No. 10-2009-0129129, filed on Dec. 22, 2009, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, or one or more intervening elements may also be present. In addition, it will also be understood that when an element is referred to as being "between" two elements, it can be the only element between the two elements, or one or more intervening elements may also be present. Like reference numerals refer to like elements throughout.

A battery pack according to an embodiment will be described as follows.

Figure 2:
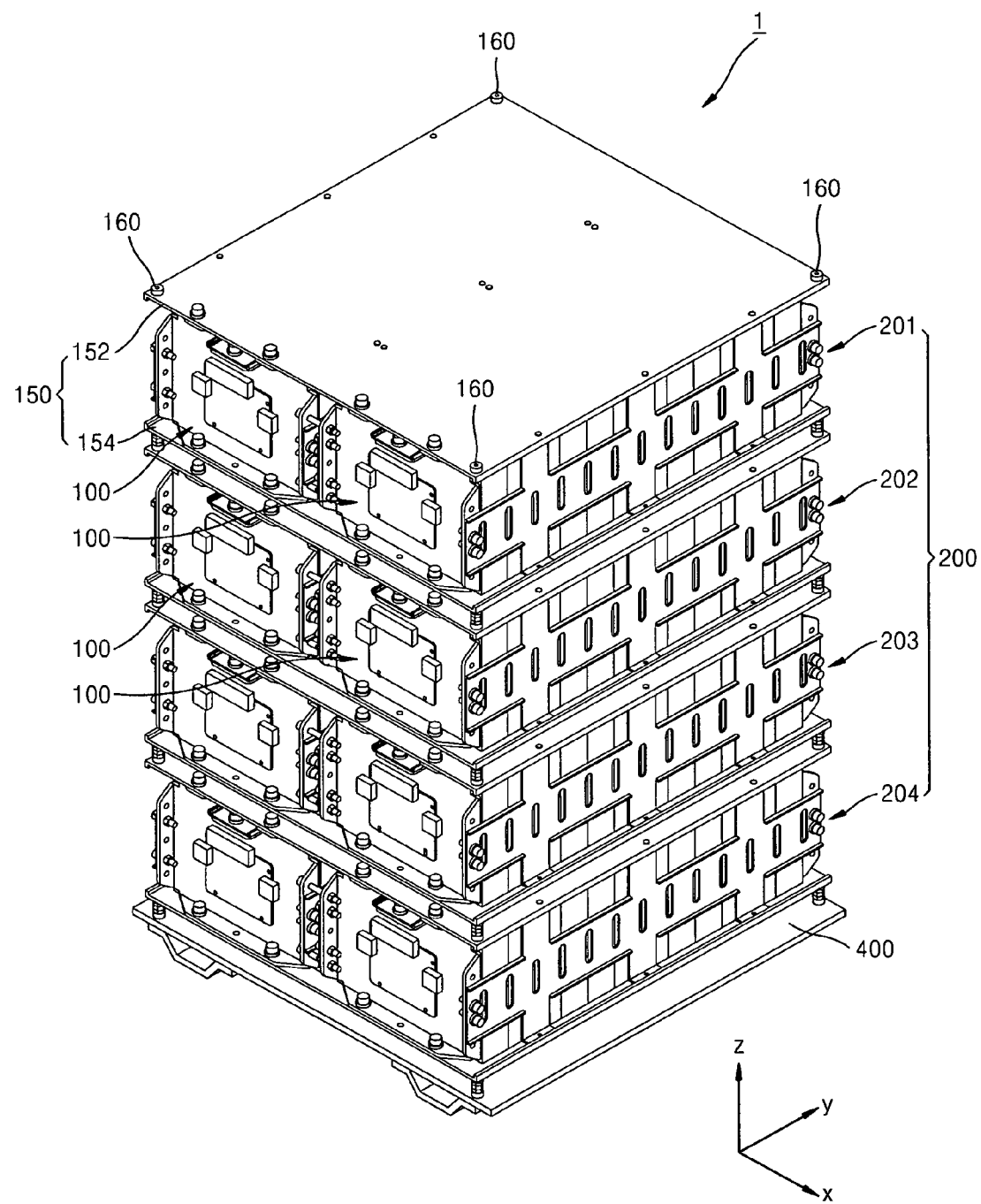
FIG. 2 illustrates a schematic perspective view of the battery pack of FIG. 1.
Figure 3:
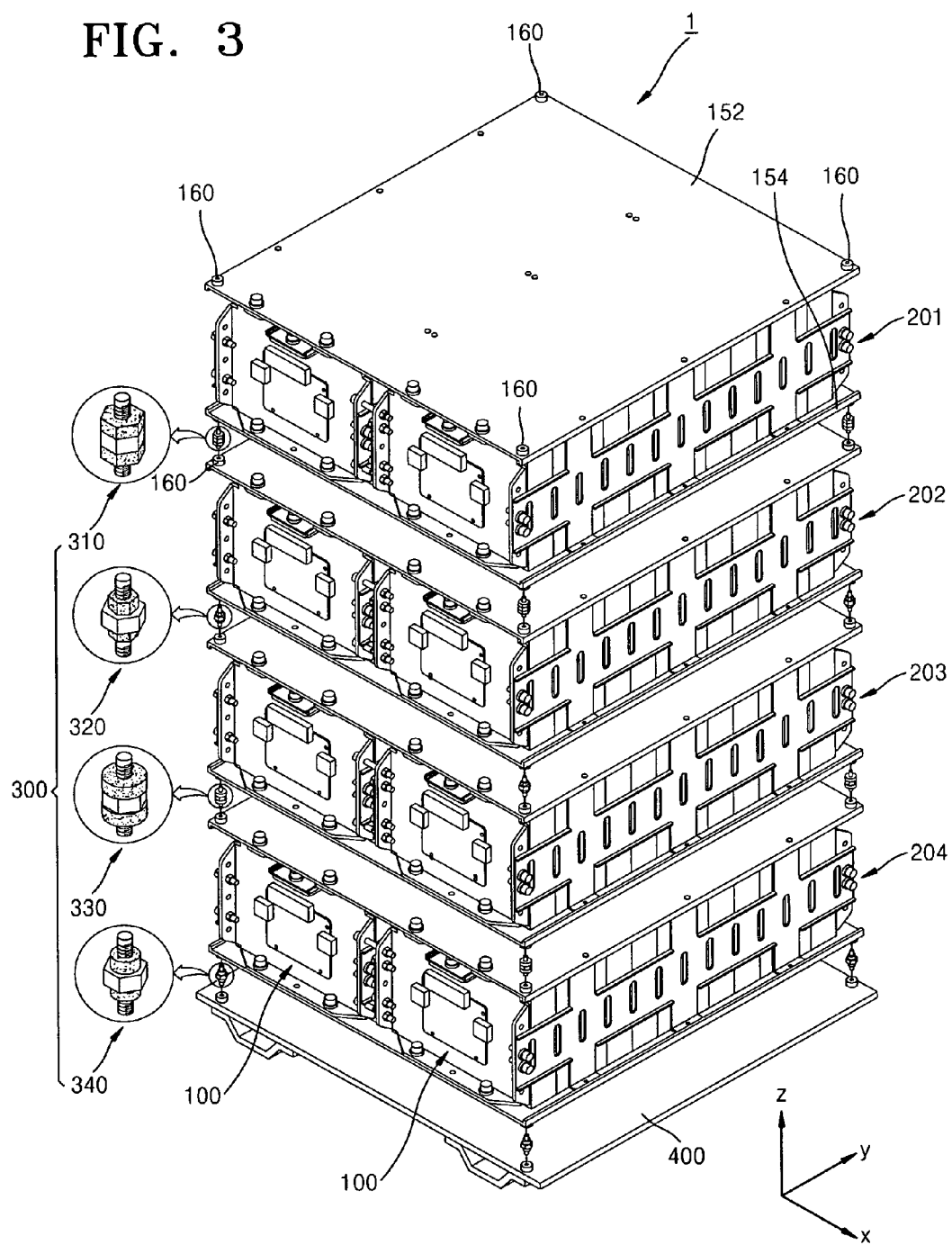
FIG. 3 illustrates an exploded perspective view of a part of the battery pack shown in FIG. 2.
Figure 4:
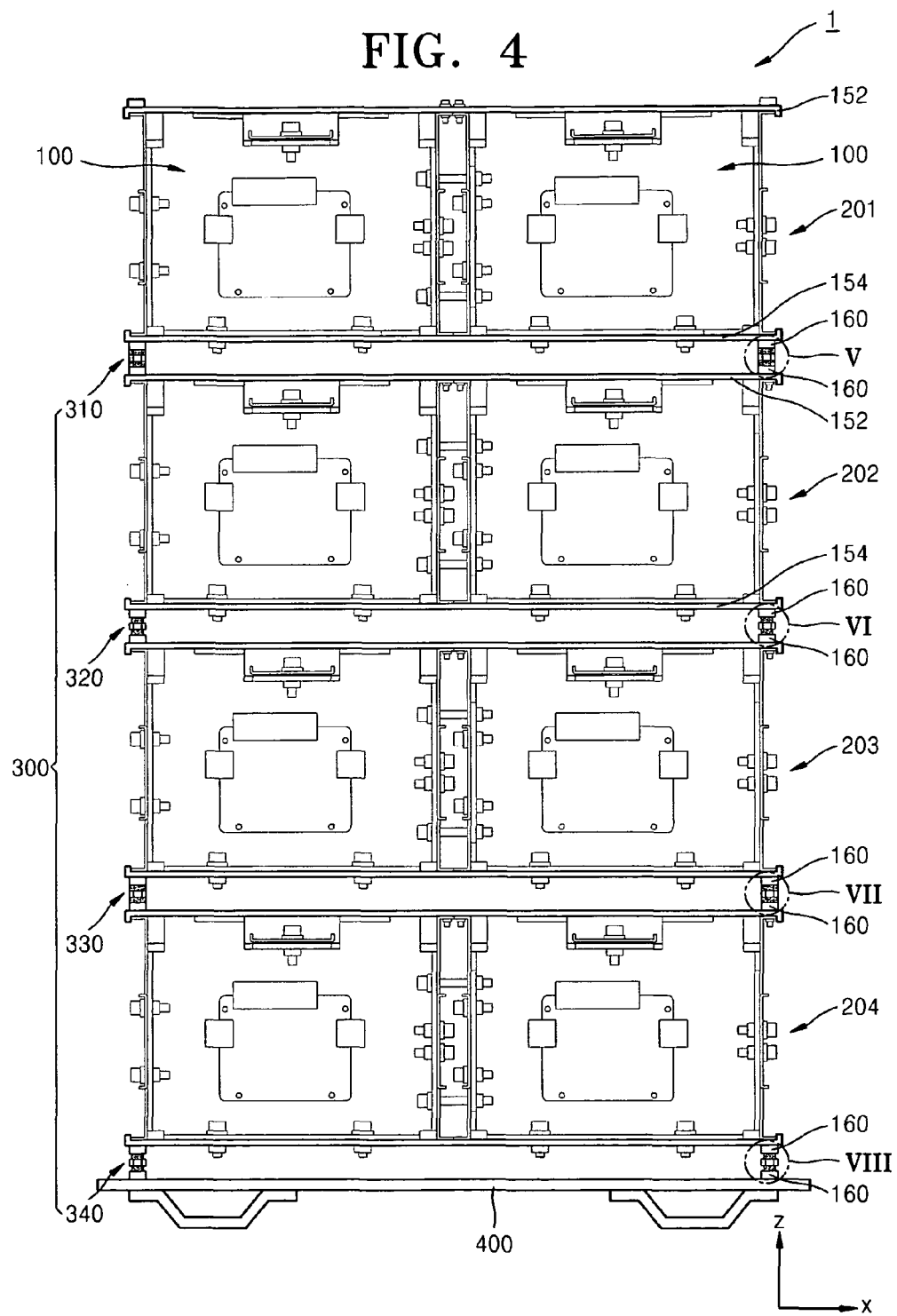
FIG. 4 illustrates a front view of the battery pack of FIG. 2 seen from a Y-axis direction.

FIG. 1 illustrates a schematic perspective view of a battery module included in a battery pack 1 according to an embodiment. FIG. 2 illustrates a schematic perspective view of the battery pack 1 of FIG. 1. FIG. 3 illustrates an exploded perspective view of a part of the battery pack shown in FIG. 2. FIG. 4 illustrates a front view of the battery pack of FIG. 2 seen from a Y-axis direction. FIGS. 5 through 8 illustrate exploded perspective views of parts V through VIII of FIG. 4. FIGS. 9A through 9C illustrate exploded perspective views of examples of elastic coupling members according to embodiments. FIG. 10 illustrates a cross-sectional view of an elastic coupling member coupled in a coupled state.

In some drawings, X, Y, and Z axes are shown, and for convenience, it is assumed that the direction of the X-axis is a left-right direction, the direction of the Y-axis is a back-front direction, and the direction of the Z-axis is an up-down direction. However, the X, Y, and Z-axis directions are not limited to the above example. Battery modules may be stacked in the X, Y, and Z-axis directions.

The battery pack 1 according to the present embodiment may include a plurality of battery modules 100, a frame 400, and elastic coupling members 300.

Each of the battery modules 100 may include a plurality of unit battery cells 10. The unit battery cells 10 may be stacked in a row. The unit battery cells 10 may be fixedly disposed between end plates 120 and side plates 130. Flange portions 170 for coupling to the end plates 120 may be disposed on upper and lower portions of the end plates 120.

In an implementation, referring to FIG. 2, the battery pack 1 of the present embodiment may include, e.g., eight battery modules 100. Two battery modules 100 may form a layer; and the battery pack 1 may include four layers of battery modules 100. Here, the layers, each including two battery modules 100, may each be referred to as a layer 200.

In the battery pack 1 of the present embodiment, the four layers 200 may be stacked in an up-and-down direction, i.e., in a z-axis direction. The layers 200, as labeled from an upper layer to a lower layer, may respectively include first, second, third, and fourth layers 201, 202, 203, and 204.

The two battery modules 100 constituting each layer 200 may be fixedly coupled to each other by a layer frame 150. The layer frame 150 may include an upper plate 152 disposed on upper portions of the two battery modules 100 and a lower plate 154 disposed on lower portions of the two battery modules 100. The upper plate 152 and the lower plate 154 may be coupled to the two battery modules 100 to couple the battery modules 100 of the layer 200 to each other.

The upper plate 152 of the layer frame 150 may include a plurality of bosses 160, each boss 160 including a screw recess 162 on an inner circumferential surface thereof. The lower frame 154 of the layer frame 150 may also include a plurality of the bosses 160, each boss 160 including a screw recess 162. The bosses 160 of the lower frame 154 may be disposed at positions corresponding to the bosses 160 of another layer frame 150 of an adjacent layer 200.

In the present embodiment, the two battery modules 100 constituting each layer 200 may be coupled to each other by the layer frame 150, which layer frame 150 may include the upper plate 152 and the lower plate 154. However, in an alternative implementation, the two battery modules 100 may be directly coupled to each other by screws. In an alternative implementation, each of the layers 200 may include, e.g., one battery module 100 or three or more battery modules 100.

The frame 400 may support the plurality of battery modules 100. The frame 400 may be formed of a plate-shaped member having rigidity sufficient to support the stacked plurality of layers 200. The frame 400 may be coupled to the fourth layer 204 to support the plurality of battery modules 100. Thus, the battery modules 100 may be connected to each other. Some of the battery modules 100, i.e., the battery modules 100 forming the fourth layer 204, may be coupled to the frame 400. Accordingly, all the battery modules 100 may be fixed with respect to the frame 400. The frame 400 may include another plurality of bosses 160 at locations corresponding to the bosses 160 of the lower plate 154 of the layer frame 150 of the fourth layer 204.

In the present embodiment, the frame 400 may be formed as a plate. However, the shape of the frame 400 is not limited thereto, and may be formed as, e.g., a cylinder or a box.

The elastic coupling members 300 may be disposed between every two layers 200 as well as between the fourth layer 204 and the frame 400 in order to elastically connect each layer 200 to another layer 200 and the fourth layer 204 to the frame 400. In other words, the elastic coupling members 300 may elastically connect the first through fourth layers 201, 202, 203, and 204 to each other and the fourth layer 204 and the frame 400 to each other. The elastic coupling members 300 may not be disposed between the two battery modules 100 included in each layer 200. Thus, the elastic coupling members 300 may elastically connect some of the battery modules 100 and the frame 400.

The elastic coupling members 300 may include first through fourth elastic coupling members 310, 320, 330, and 340, each having different elastic coefficients from one another. The first elastic coupling member 310 may be disposed between the first and second layers 201 and 202, the second elastic coupling member 320 may be disposed between the second and third layers 202 and 203, the third elastic coupling member 330 may be disposed between the third and fourth layers 203 and 204, and the fourth elastic coupling member 340 may be disposed between the fourth layer 204 and the frame 400.

The first through fourth elastic coupling members 310, 320, 330, and 340 may respectively include first through fourth elastic bodies 312, 322, 332, and 342. Each elastic coupling member 300 may further include an escape prevention unit, i.e., a retention unit.

The elastic bodies 312, 322, 332, and 342 may be inserted between the layers 200 and between the fourth layer 204 and the frame 400 so as to provide elasticity between the layers 200 and between the fourth layer 204 and the frame 400. The first through fourth elastic coupling members 310, 320, 330, and 340 may respectively include the elastic bodies 312, 322, 332, and 342 having different elastic coefficients from each other. The elastic bodies 312, 322, 332, and 342 may be formed of, e.g., a rubber material or a synthetic resin having a high energy dissipating property, or may be formed of, e.g., a metal material having elasticity.

The retention unit may prevent the elastic bodies 312, 322, 332, and 342 disposed between the layers 200 and between the fourth layer 204 and the frame 400 from moving from their originally set positions. The elastic coupling members 300 may include coupling members 314 inserted into each of the elastic bodies 312, 322, 332, and 342. Each coupling member 314 may have one end 316 and another end 318 respectively coupled to each of the layers 200.

Each coupling member 314 may be formed as a bar or cylinder having screw threads on the one end 316 and on the other end 318. The one end 316 of each of the coupling members 314 may be coupled to the bosses 160 in the layer frame 150 located above each of the coupling members 314. The other end 318 of each of the coupling members 314 may be coupled to the bosses 160 of the layer frame 150 located under each of the coupling members 314 or to the bosses 160 of the frame 400. The bosses 160 may have screw threads generally formed in the same rotary direction. Thus, the screw threads on the one end 316 and the other end 318 of the coupling members 314 may have opposite rotary directions to each other. Therefore, when the coupling members 314 are rotated in a direction, both ends 316, 318 of the coupling members 314 may be simultaneously coupled to the bosses 160.

Each of the coupling members 314 may include a bolt head 315 protruding around the coupling member 314. The bolt head 315 may have a polygonal-shaped outer surface so that a wrench used to rotate the coupling member 314 does not slide off the coupling member 314 when rotating the coupling member 314 with the wrench.

The first elastic coupling member 310 may elastically connect the first layer 201 and the second layer 202 to each other. The elastic body 312 of the first elastic coupling member 310 may be formed as a polygonal pillar with a hollow portion.

Figure 5:
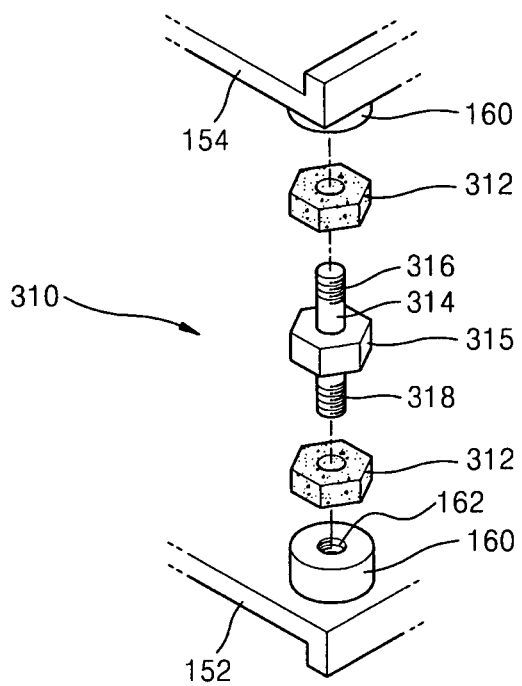
FIG. 5 illustrates an exploded perspective view of part V in the battery pack of FIG. 4.

Referring to FIG. 5, a pair of the first elastic bodies 312 of the first elastic coupling member 310 may be coupled to one coupling member 314 in such a way as to be respectively disposed on upper and lower portions of the bolt head 315 of the coupling member 314. When the coupling member 314 is coupled to two layers 200, the first elastic bodies 312 may be fixedly located between the two layers 200 so as not to move from its originally set position.

Figure 6:
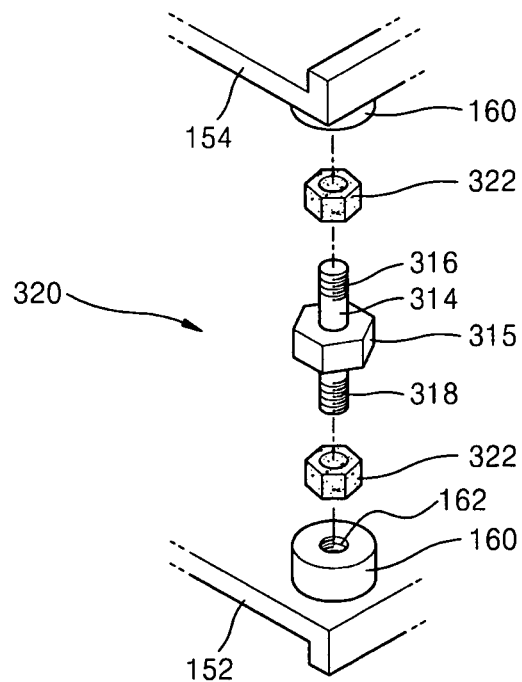
FIG. 6 illustrates an exploded perspective view of part VI in the battery pack of FIG. 4.

Referring to FIG. 6, the second elastic coupling member 320 may elastically connect the second layer 202 and the third layer 203 to each other. The second elastic body 322 of the second elastic coupling member 320 may also be formed as a polygonal pillar with a hollow portion therein. In addition, a pair of the second elastic bodies 322 of the second coupling member 320 may be coupled to one coupling member 314 in such a way as to be respectively disposed on upper and lower portions of the bolt head 315 of the coupling member 314. The second elastic bodies 322 of the second elastic coupling member 320 may have a smaller cross-sectional area than the first elastic bodies 312 of the first elastic coupling member 310. In other words, a cross-sectional shape of the second elastic bodies 322 may be different from a cross-sectional shape of the first elastic bodies 312 of the first elastic coupling member 310. Accordingly, the second elastic coupling member 320 may have an elastic coefficient different from the elastic coefficient of the first elastic coupling member 310.

Figure 7:
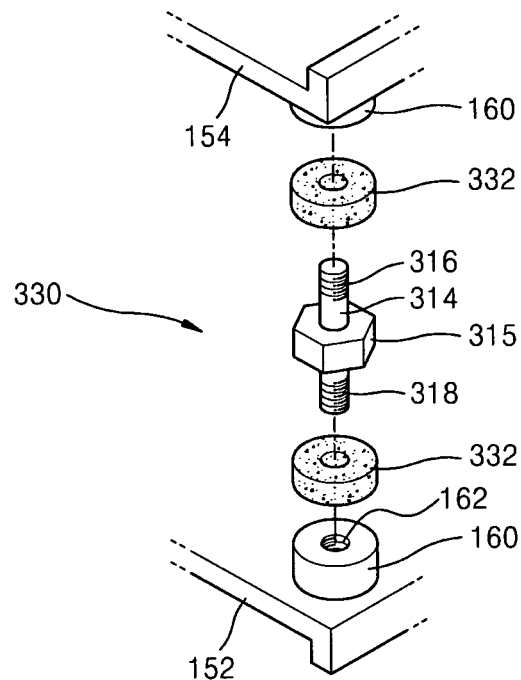
FIG. 7 illustrates an exploded perspective view of part VII in the battery pack of FIG. 4.

Referring to FIG. 7, the third elastic coupling member 330 may elastically connect the third layer 203 and the fourth layer 204 to each other. The third elastic body 332 of the third elastic coupling member 330 may be formed as a polygonal or cylindrical pillar with a hollow portion therein. In addition, a pair of the third elastic bodies 332 of the third coupling member 330 may be coupled to one coupling member 314 in such a way as to be respectively disposed on upper and lower portions of the bolt head 315 of the coupling member 314. A cross-sectional shape of the third elastic bodies 332 may be different from the cross-sectional shapes of the first and second elastic bodies 312 and 322 of the first and second elastic coupling members 310 and 320. Accordingly, the third elastic coupling member 330 may have an elastic coefficient different from the elastic coefficients of the first and second elastic coupling members 310 and 320.

Figure 8:
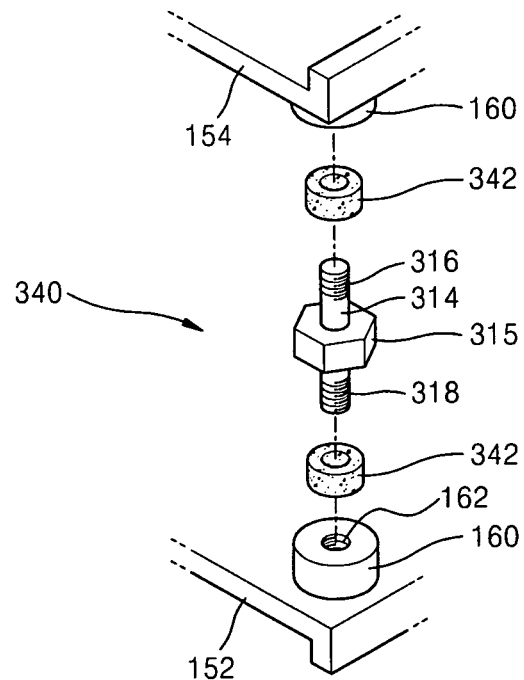
FIG. 8 illustrates an exploded perspective view of part VIII in the battery pack of FIG. 4.
Figure 9A:
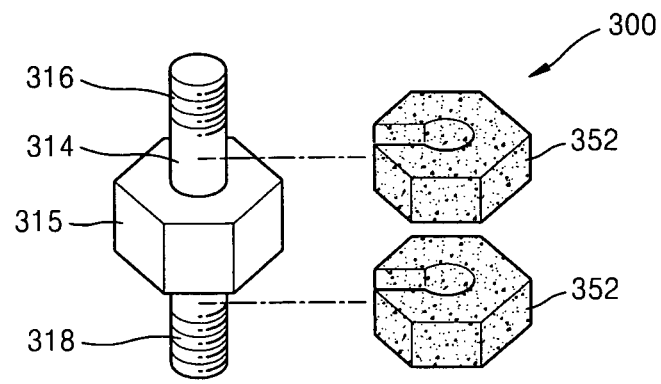
FIG. 9A illustrates an exploded perspective view of an example of an elastic coupling member.
Figure 9B:
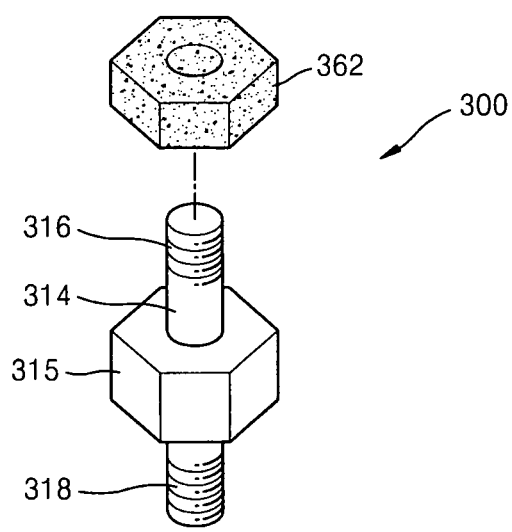
FIG. 9B illustrates an exploded perspective view of another example of an elastic coupling member.

Referring to FIG. 8, the fourth elastic coupling member 340 may elastically connect the fourth layer 204 and the frame 400 to each other. The fourth elastic body 342 of the fourth elastic coupling member 340 may be formed as a polygonal or cylindrical pillar with a hollow portion therein. In addition, a pair of the fourth elastic bodies 342 of the fourth coupling member 340 may be coupled to one coupling member 314 in such a way as to be disposed on upper and lower portions of the bolt head 315 of the coupling member 314. A cross-sectional shape of the fourth elastic bodies 342 may be different from the cross-sectional shapes of the first through third elastic bodies 312, 322, and 332 of the first, second, and third elastic coupling members 310, 320, and 330. Accordingly, the fourth elastic coupling member 340 may have an elastic coefficient different from the elastic coefficients of the first, second, and third elastic coupling members 310, 320, and 330.

As described above, the elastic bodies 312, 322, 332, and 342 may be formed as pillars having hollow portions therein. In an alternative implementation, the elastic bodies 312, 322, 332, and 342 may instead be formed to have open end portions. Thus, as illustrated in FIG. 9A, when a part of an elastic body 352 is opened, it may be easy to couple the elastic body 352 with the coupling member 314 by inserting the elastic body 352 onto the coupling member 314. For example, the layers 200 may be stacked while temporarily coupling the coupling members 314 thereto so as to preliminarily assemble the battery pack 1. Then, the elastic body 352 may be inserted onto each of the coupling members 314; and the coupling members 314 may be completely coupled to the layers 200 to complete assembly of the battery pack 1.

The elastic body 352 with open end portions may be applied to the first through fourth elastic coupling members 310, 320, 330, and 340.

In an implementation, the elastic coupling members 300 may each include only one elastic body 362. For example, as illustrated in FIG. 9B, the elastic body 362 may be coupled to either of the upper and lower portions of the bolt head 315 of one coupling member 314. In an alternative implementation, the elastic coupling members 300 may each include only one elastic body 372 and may not include the bolt head 315 on the coupling member 314. For example, as illustrated in FIG. 9C, the elastic body 372 may be formed as a, e.g., polygonal, pillar having a polygonal hollow portion therein, and may be coupled to a corresponding polygonal outer surface 317 of the coupling member 314. In this case, since the polygonal outer surface 317 of the coupling member 314 may be inserted in the corresponding polygonal hollow portion of the elastic body 372, rotation of the elastic body 372 around the coupling member 314 may be prevented. In addition, since the elastic body 372 may be formed as a polygonal pillar, a wrench may grasp a grip portion provided on the elastic body 372 instead of the bolt head 315.

Hereinafter, operations and effects of the battery pack 1 according to embodiments will be described.

The battery pack 1 of the present embodiment may be formed by stacking four layers 200 of battery cells 100 on the frame 400. The elastic coupling members 300 may be coupled to the bosses 160 of each of the layer frames 150 so that the layers 200 and the frame 400 may be elastically coupled to each other.

In addition, the elastic coupling members 300 may have different elastic coefficients from each other. That is, the first through fourth elastic coupling members 310, 320, 330, and 340 coupled to the layers 200 and the frame 400 may have different elastic bodies 312, 322, 332, and 342 from each other. Thus, the first through fourth elastic coupling members 310, 320, 330, and 340 have different elastic coefficients from each other.

The layers 200 may be coupled to each other via screws threads on the coupling members 314 of the elastic coupling members 300. However, each of the layers 200 may minutely move with respect to each other, as illustrated in FIG. 10. Relative movement between the layers 200 may be in left-right and/or back-forth directions or may be such that angles between the layers 200 may vary. The minute movement between the layers 200 may be caused by dimensional tolerances allowed to the coupling members 314 of the elastic coupling members 300 and/or the bosses 160 and by the fact that each of the coupling members 314 may not be a completely rigid body. As a length of the coupling member 314 increases, the relative movement between the layers 200 may become greater due to greater bending of the coupling members 314. The fourth layer 204, which may be relatively close to the frame 400, may minutely move with respect to the frame 400.

The elastic bodies 312, 322, 332, and 342 of the elastic coupling members 300 may provide the battery modules 100 with elasticity in order to resist or absorb relative movement between the layers 200 and the battery modules 100.

All materials have a resonant frequency. A material at its resonant frequency vibrates greatly. The resonant frequency may be determined according to a weight and elastic coefficient of the material. A relation between resonant frequency, weight, and elastic coefficient is represented by the following equation:

$$w = \sqrt{\frac{k}{m}}$$

In the equation, w denotes the resonant frequency of a material, k denotes the elastic coefficient of the material, and m denotes the weight of the material.

The equation above is for a system having a degree of freedom (DOF) of 1; and in general, a system having n DOF may have n numbers of resonant frequencies. However, the present embodiment will be described based on the equation above for ease of understanding.

Referring to the equation above, the resonant frequency may be affected by the elastic coefficient and the weight of the material. Each of the layers 200 of the present embodiment may have a unique resonant frequency. Since the weights of the layers 200 may be similar to each other, the resonant frequency of each layer 200 may be affected by the elastic coefficient thereof, which may be dependent on a boundary condition of each layer 200. Therefore, when one layer 200 is coupled to an object by a material having elasticity, the resonant frequency of the layer 200 may be determined according to the elastic coefficient of the material.

Each of the layers 200 may be coupled to another layer 200 or the frame 400 by the elastic coupling members 300 having different elastic coefficients from each other. Thus, the boundary conditions of the layers 200 may be different from each other. Accordingly, the resonant frequencies of the layers 200 may be different from each other.

In the battery pack 1 of the present embodiment, the layers 200 forming the battery pack 1 may have different resonant frequencies from each other due to the differences in elastic coefficients of the elastic coupling members therebetween. Thus, when vibrations at any frequency are applied to the battery pack 1, simultaneous resonating of all the layers 200 may be prevented. Therefore, severe vibration of the battery pack 1 at any frequency may be prevented.

That is, when vibrations at a certain frequency are applied to the battery pack 1 of the present embodiment, some of the layers 200 may resonate. However, the resonance of all the layers 200 may not occur due to the different resonant frequencies of the layers 200. Therefore, severe vibration of the battery pack 1 may be prevented with respect to all frequencies.

When the elastic bodies 312, 322, 332, and 342 are formed of, e.g., a rubber material or a synthetic resin material, the elastic coupling members 300 may also function as dampers. Therefore, the elastic bodies 312, 322, 332, and 342 of the elastic coupling members 300 may also disperse energy from vibrations.

When the resonant frequency of a certain layer 200 is similar to the frequency at a vehicle vibrates, the layer 200 may resonate. Therefore, it may be desirable to change the resonant frequency of the layer 200. The resonant frequency of the layer 200 may be easily changed by changing the elastic coefficients of the elastic bodies 312, 322, 332, and 342 of the elastic coupling members 300. The elastic coefficients of the elastic bodies 312, 322, 332, and 342 may be easily changed by changing at least one of the cross-sectional shape, thickness, and material of the elastic bodies 312, 322, 332, and 342.

In the present embodiment, vibrations of one layer 200 that includes two battery modules 100 are described. However, descriptions thereof may be applied to the layer 200 including, e.g., one battery module 100 or three or more battery modules. When the layer 200 includes one battery module 100, the layer 200 may vibrate in the same manner as the battery module 100. Thus, descriptions about the layer 200 may be applied to the battery module 100.

Hereinafter, a battery pack according to another embodiment will be described.

Figure 11:
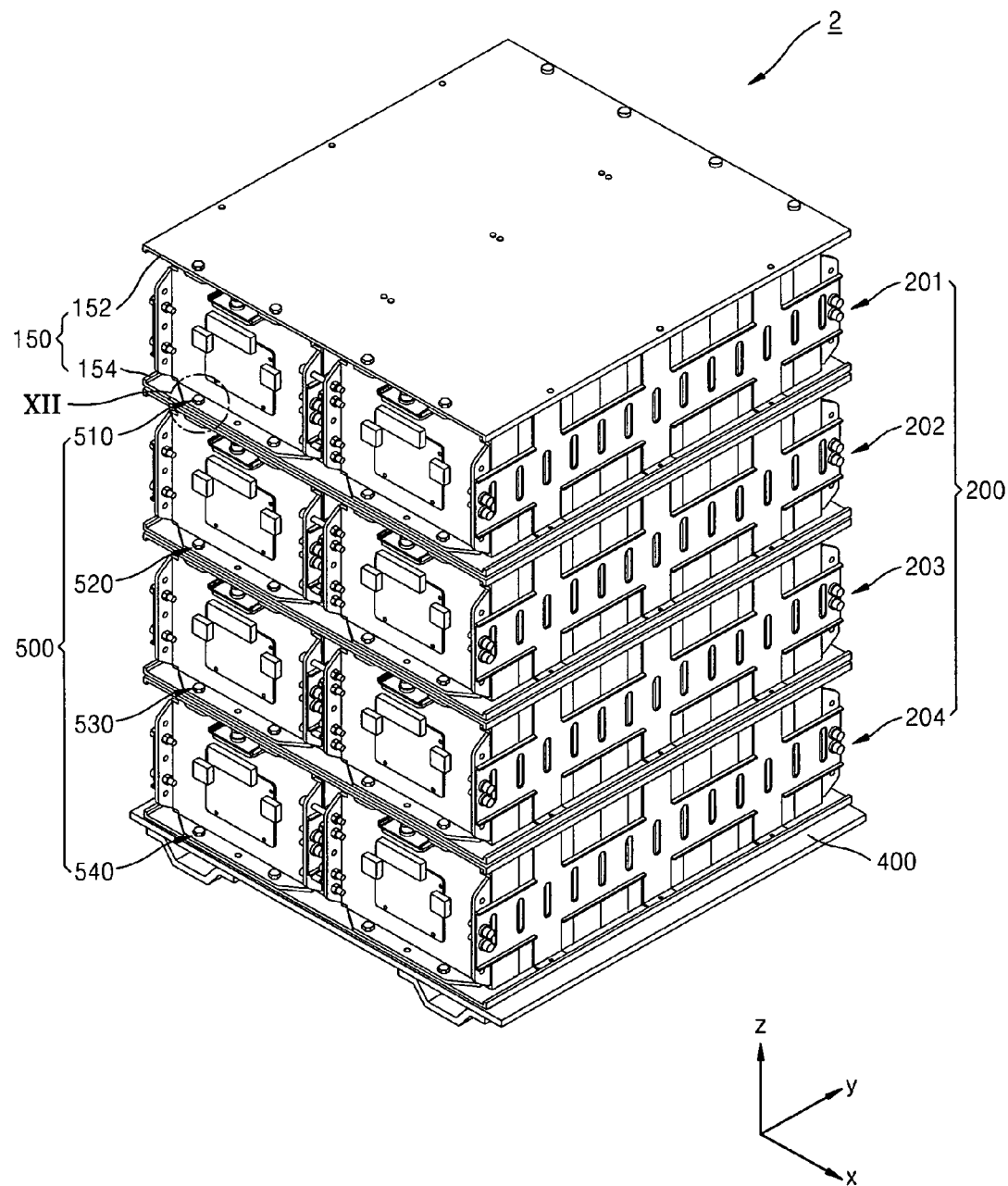
FIG. 11 illustrates a schematic perspective view of a battery pack according to another embodiment.
Figure 12:
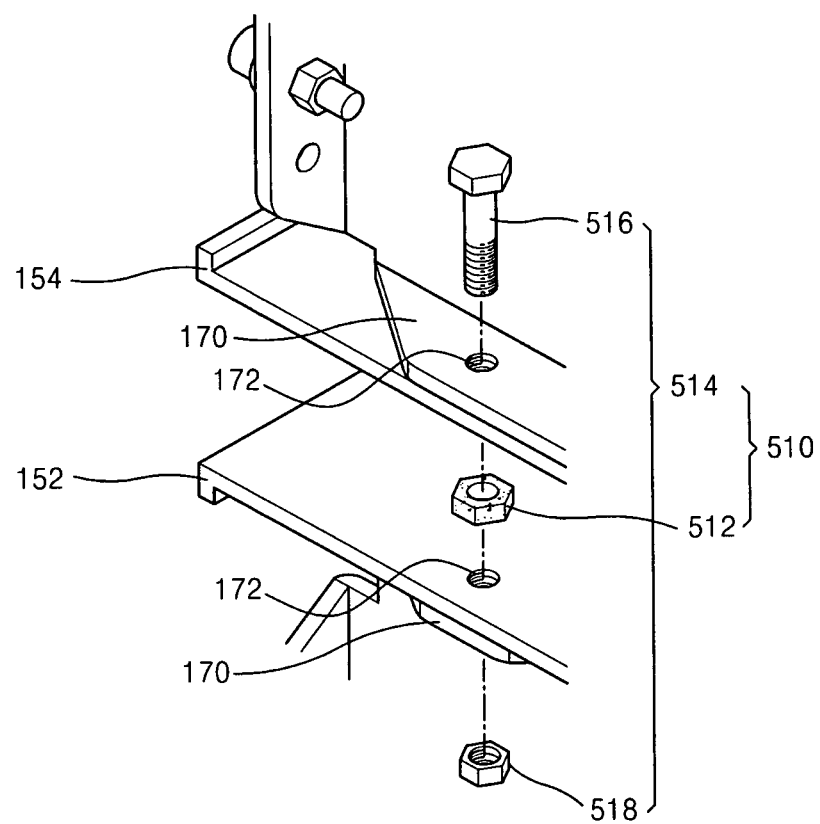
FIG. 12 illustrates an exploded perspective view of part XII in the battery pack of FIG. 11.

FIG. 11 illustrates a schematic perspective view of a battery pack 2 according to another embodiment. FIG. 12 illustrates an enlarged perspective view of part XII of FIG. 11.

Like the battery pack 1 according to the previous embodiment, the battery pack 2 of the present embodiment may be formed by stacking a plurality of layers 200, each layer 200 including battery modules 100.

The battery pack 2 of the present embodiment may be similar to the battery pack 1 of the previous embodiment except for a structure of elastic coupling members 500. That is, the elastic coupling member 500 coupled to each of the layers 200 may be different from the elastic coupling members 300 of the battery pack 1 according to the previous embodiment.

Each of the battery modules 100 in each of the layers 200 may include a flange portion 170 that includes a coupling hole 172. A coupling hole 172 may also formed in each layer frame 150 coupling the battery modules 100 to each other at a position corresponding to the coupling hole 172 of the flange portion 170.

The elastic coupling members 500 may include first through fourth elastic coupling members 510, 520, 530, and 540. FIG. 12 illustrates a configuration in which the first elastic coupling member 510 is coupled to two layers 200. The second through fourth elastic coupling members 520, 530, and 540 may be coupled to the layers 200 in the same configuration. Elastic bodies of the first through fourth elastic coupling members 510, 520, 530, and 540 may have at least one of different cross-sectional shapes, different thicknesses, and different materials from each other so that the first through fourth elastic coupling members 510, 520, 530, and 540 may have different elastic coefficients from each other.

Each of the elastic coupling members 500 may include an elastic body 512 and a retention unit.

The retention unit may each include a coupling member 514. The coupling members 514 may each include a bolt 516 and a nut 518 coupled to an end of the bolt 516. The elastic body 512 may be disposed between the flange portions 170 of two layers 200 and may be inserted around the bolt 516 of each retention unit. Therefore, the elastic coupling members 500 of the present embodiment may elastically connect the battery modules 100 to each other.

In the battery pack 2 of the present embodiment, the elastic coupling members 510, 520, 530, and 540 coupled to the layers 200 may have different elastic coefficients from each other, like those of the battery pack 1 of the previous embodiment. Thus, simultaneous resonating of all the layers 200 due to vibrations at any frequency may be prevented.

Next, a battery pack according to yet another embodiment will be described.

Figure 13:
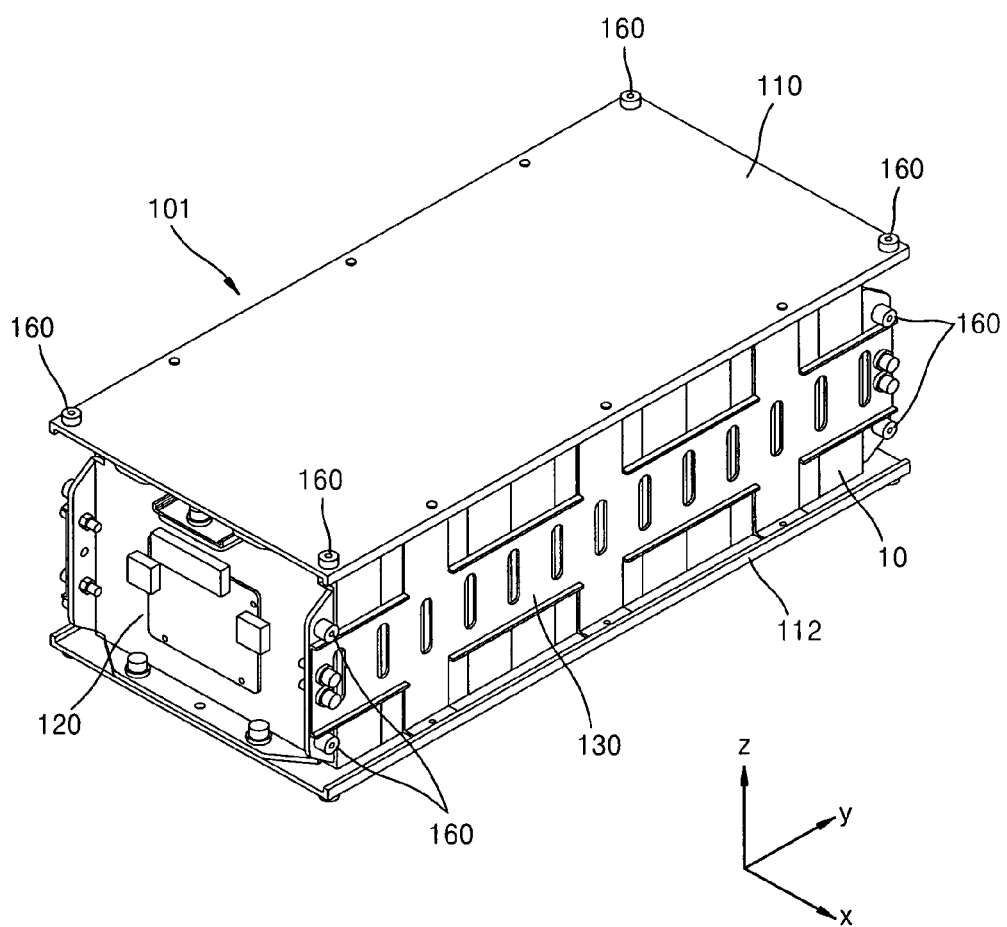
FIG. 13 illustrates a schematic perspective view of a battery module included in a battery pack according to yet another embodiment.
Figure 14:
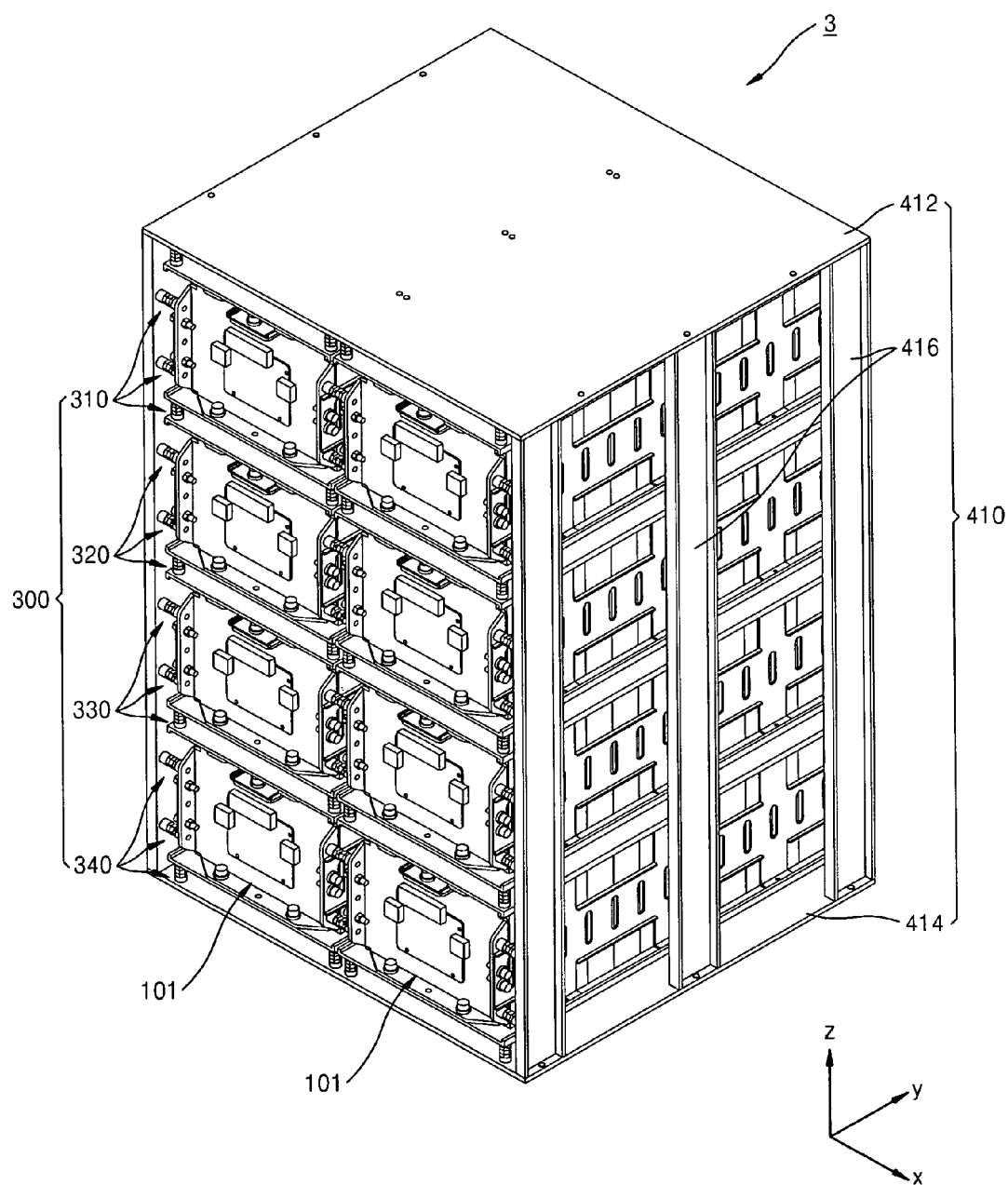
FIG. 14 illustrates a schematic perspective view of the battery pack of FIG. 13.
Figure 15:
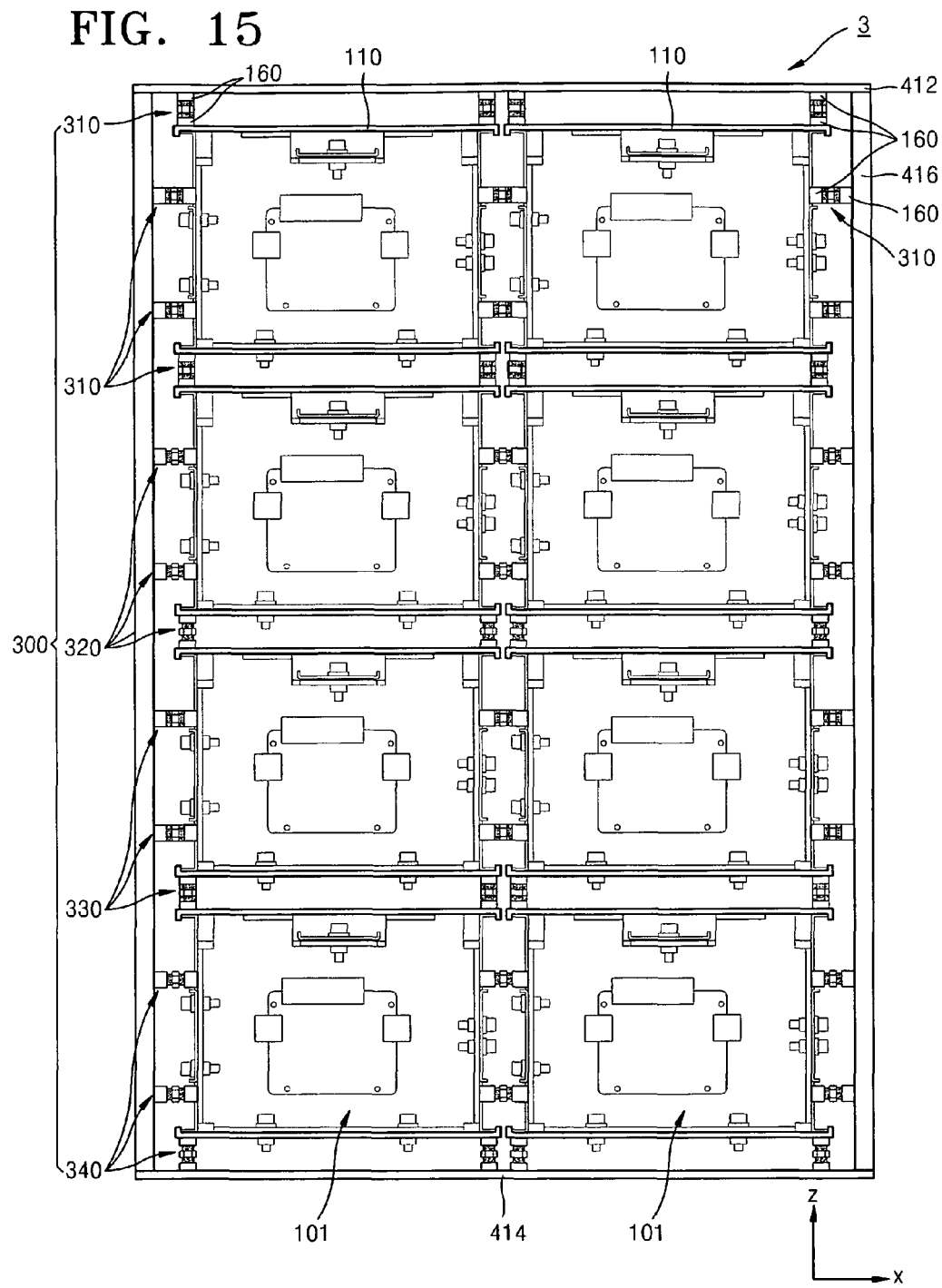
FIG. 15 illustrates a front view of the battery pack of FIG. 14 seen from the Y-axis direction.

FIG. 13 illustrates a schematic perspective view of a battery module of a battery pack 3 according to yet another embodiment. FIG. 14 illustrates a schematic perspective view of the battery pack 3 of FIG. 13. FIG. 15 illustrates a schematic front view of the battery pack 3 seen from the Y-axis direction.

Referring to FIGS. 13 through 15, the battery pack 3 of the present embodiment may include a plurality of battery modules 101 and a frame 410 receiving the plurality of battery modules 101. The battery modules 101 may be coupled to each other by elastic coupling members 300. The battery modules 101 and the frame 410 may be coupled to each other by elastic coupling members 300. That is, each of the battery modules 101 may be coupled to another battery module 101 and/or the frame 410 simultaneously by the elastic coupling members 300.

The battery modules 101 may each include an upper plate 110, a lower plate 112, a side plate 130, and an end plate 120. The upper plate 110 and the lower plate 112 may include bosses 160 protruding therefrom. The end plate 120 may also include the bosses 160 protruding toward left and right portions of each battery module 101.

The frame 410 may include an upper plate 412, a lower plate 414, and side members 416. The upper plate 412, the lower plate 414, and the side members 416 may be fixedly coupled to each other by, e.g., welding or screws. The frame 410 may also include bosses 160 corresponding to the bosses 160 of the battery modules 101 to which the elastic coupling members 300 may be coupled.

The elastic coupling members 300 of the batter pack 3 according to the present embodiment may be the same as the elastic coupling members 300 in the battery pack 1 according to a previous embodiment. The elastic coupling members 300 may be coupled to the bosses 160 of the battery module 101 and the bosses 160 of the frame 410 so as to elastically connect the battery modules 101 to each other and one battery module 101 to the frame 410. The elastic coupling member 300 coupled to each of the battery module 101 may have a different elastic coefficient from those of the other elastic coupling members 300 coupled to other battery modules 101.

Therefore, in the battery pack 3 of the present embodiment, the battery modules 101 may not have the same resonant frequencies as each other. Thus, simultaneous resonating of all the battery modules 101 with respect to any frequency may not occur.

A battery pack according to still another embodiment will be described as follows.

Figure 16:
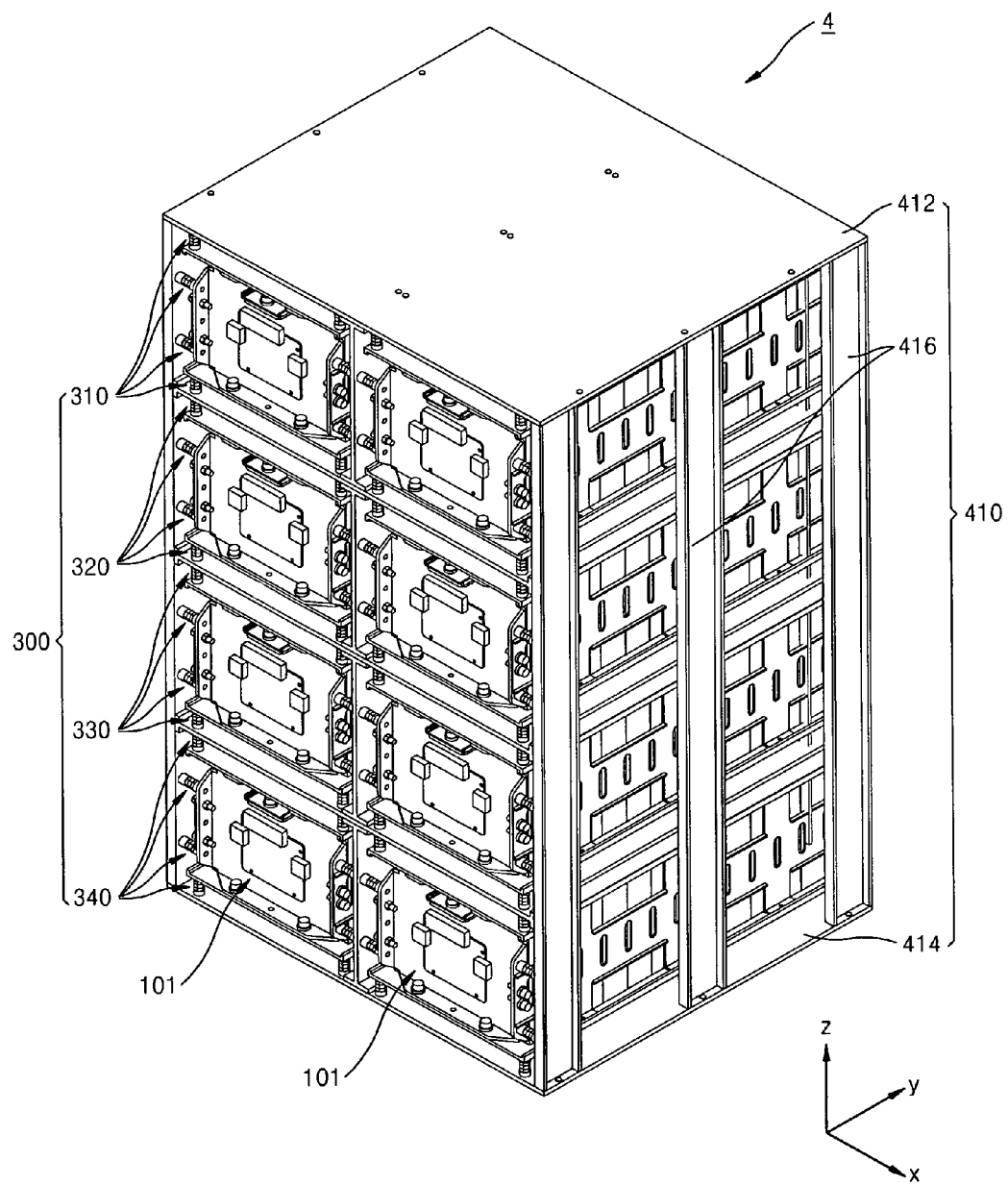
FIG. 16 illustrates a schematic perspective view of a battery pack according to still another embodiment.
Figure 17:
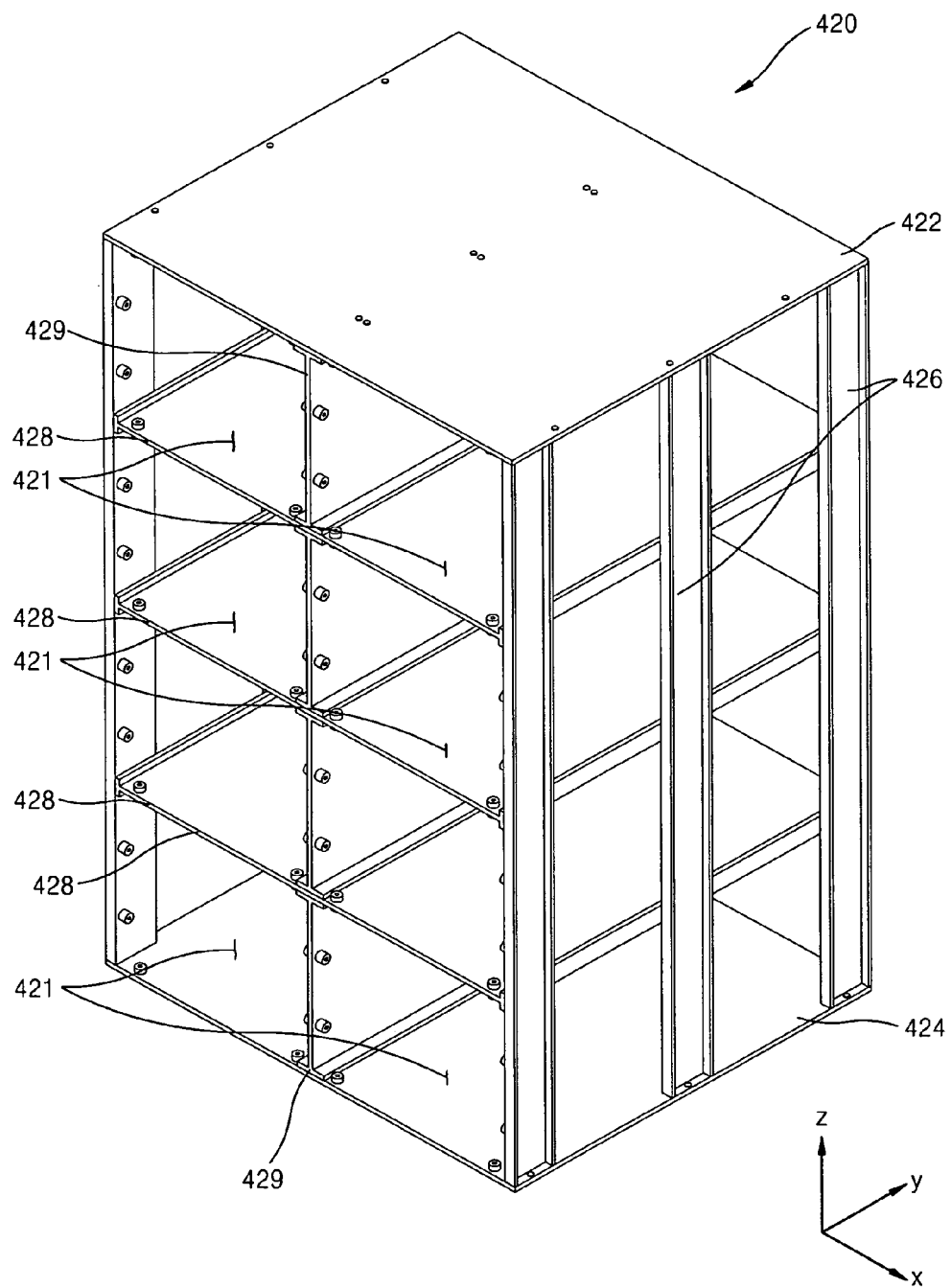
FIG. 17 illustrates a schematic perspective view of a frame of the battery pack of FIG. 16.
Figure 18:
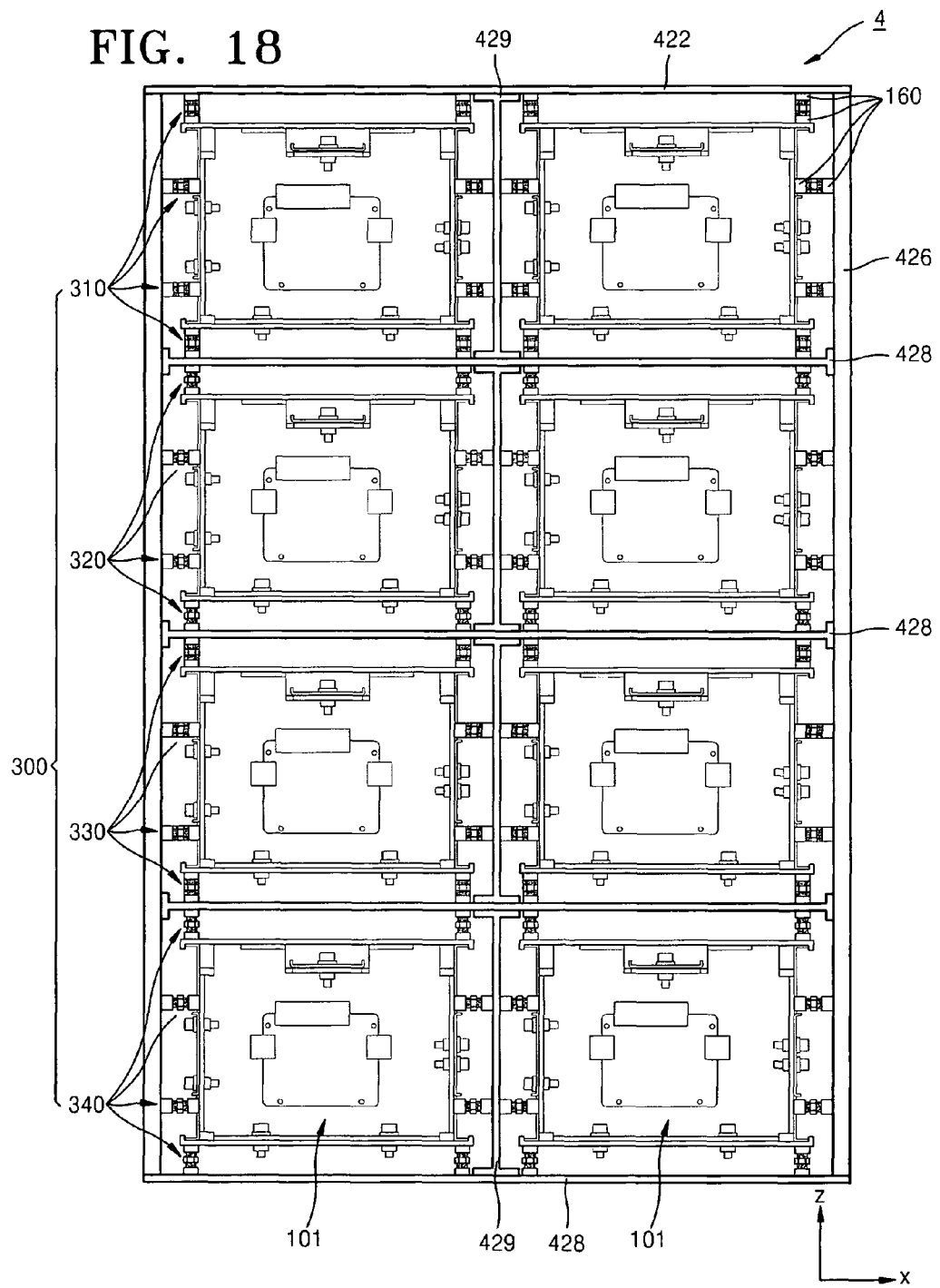
FIG. 18 illustrates a front view of the battery pack shown in FIG. 16 seen from the Y-axis direction.

FIG. 16 illustrates a schematic perspective view of a battery pack 4 according to still another embodiment. FIG. 17 illustrates a schematic perspective view of a frame of the battery pack 4 of FIG. 16. FIG. 18 illustrates a front view of the battery pack 4 of FIG. 16 seen from the Y-axis direction.

Referring to FIGS. 16 through 18, the battery pack 4 of the present embodiment may include battery modules 101, a frame 420, and elastic coupling members 300.

The battery module 101 of the present embodiment may be the same as the battery module 101 in the battery pack 3 illustrated in FIG. 13.

The frame 420 may include a plurality of defined spaces 421, as illustrated in FIG. 17.

The frame 420 may include an upper plate 422, a lower plate 424, side members 426, and a plurality of horizontal plates 428 and a plurality of vertical plates 429 disposed in an inner space defined by the upper plate 422, the lower plate 424, and the side members 426, in order to form the plurality of defined spaces 421. The upper plate 422, the lower plate 424, the side members 426, the horizontal plates 428, and the vertical plates 429 may be fixedly coupled to each other by, e.g., welding or screws.

The battery modules 101 may be disposed in each of the defined spaces 421 of the frame 420 and may be coupled to the frame 420 by the elastic coupling members 300. The elastic coupling members 300 may be the same as those of the battery pack 1 according to the previous embodiment.

The battery module 101 located at an uppermost portion may be coupled to the frame 420 by a first elastic coupling member 310. The next lower battery module 101 may be coupled to the frame 420 by a second elastic coupling member 320. The next lower battery module 101 may be coupled to the frame 420 by a third elastic coupling member 330. The battery module 101 located at a lowermost portion may be coupled to the frame 420 by a fourth elastic coupling member 340.

In other words, the elastic coupling members 310, 320, 330, and 340 for coupling the battery modules 101 located in different layers to the frame 420 may have different elastic coefficients from each other in the battery pack 4 of the present embodiment. Thus, the boundary conditions of the battery modules 101 may be different from each other, and the battery modules 101 may have different resonant frequencies from each other.

Therefore, in the battery pack 4 of the present embodiment, the resonant frequencies of the battery modules 101 may not be the same as each other. Thus, simultaneous resonating of all the battery modules 101 at any frequency may be prevented. Accordingly, severe vibration of the battery pack 4 at any frequency may also be prevented.

The elastic coupling members 300 and 500 in the battery pack 1, 2, 3, or 4 according to the embodiments may include the coupling members 314 and 514 as retention units. However, the embodiments are not limited thereto. For example, a retention unit may include, e.g., a welding portion, an attaching portion, or a pin for coupling the elastic body to the battery modules 100 or 101 so that the elastic body does not detach from the battery modules 100 or 101.

According to the battery pack of an embodiment, the battery modules may have different resonant frequencies from each other in the battery pack, in which the battery modules including the plurality of unit battery cells may be stacked in series or in parallel. Thus, simultaneous resonating of all the battery modules at any frequency may be prevented. Therefore, vibration of the battery pack may not greatly increase at any frequency; and performance degradation and lifespan reduction of the battery may be prevented.

It will be understood that, to describe or claim the elastic coupling members as having different elastic coefficients from each other does not mean that every individual elastic coupling member in the overall battery pack must have a different elastic coefficient from every other individual elastic coupling member in the battery pack. Rather, it means that the elastic coefficients of, e.g., the first elastic coupling members 310 are different from those of, e.g., the second elastic coupling members 320, which are different from, e.g., the third elastic coupling members 330, which are different from, e.g., the fourth elastic coupling members 340. The same holds true for the elastic coupling members 510, 520, 530, and 540. Similar considerations also apply to described differences between the resonant frequencies of the elastic coupling members and differences in their shapes, thicknesses, and materials.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a plurality of battery modules, each battery module including a plurality of stacked unit battery cells;
   a frame supporting the plurality of battery modules; and
   a plurality of elastic coupling members for elastically connecting at least one battery module to another battery module or for elastically connecting the at least one battery module to the frame;
   wherein:
   elastic coupling members connected to the at least one battery module have a different elastic coefficient from elastic coupling members connected to the other battery module,
   each of the elastic coupling members includes an elastic body for providing elasticity and a retention unit for preventing the elastic body from being moved,
   the retention unit includes a coupling member, the coupling member being inserted in the elastic body and connecting the battery modules to each other and connecting at least one battery module to the frame,
   the coupling member includes screw threads on end portions thereof, and
   the battery modules and the frame include screw recesses for coupling engagement with the coupling member.

2. The battery pack as claimed in claim 1, wherein the battery modules are coupled to each other by the elastic coupling members and at least one of the battery modules is coupled to the frame by the elastic coupling members.

3. The battery pack as claimed in claim 1, wherein each battery module is coupled to other battery modules and coupled to the frame by the elastic coupling members.

4. The battery pack as claimed in claim 1, wherein the elastic body is composed of rubber.

5. The battery pack as claimed in claim 1, wherein:
   the coupling members are coupled to flange portions of the battery modules to couple the battery modules to each other, and
   the elastic body is disposed between flange portions of adjacent battery modules.

6. The battery pack as claimed in claim 1 wherein the elastic coupling members have different elastic coefficients from each other and have at least:
   a cross-sectional shape,
   a thickness of the elastic body, or
   an elastic material of the elastic body,
   different from the other elastic coupling members.

7. The battery pack as claimed in claim 1 wherein the elastic body has an opened portion at a side for sideways insertion onto the coupling member.

8. The battery pack as claimed in claim 1 wherein the coupling member:
   is coupled to the battery modules or the frame by screw threads, and
   has a bolt head protruding along a circumference thereof.

9. The battery pack as claimed in claim 8, wherein the elastic body is disposed on at least one side of the bolt head.

10. The battery pack as claimed in claim 1, wherein each of the battery modules is coupled to the frame by the elastic coupling members.

11. The battery pack as claimed in claim 10, wherein:
the frame includes a plurality of defined spaces, and
the battery modules are disposed in each of the defined spaces.

12. The battery pack as claimed in claim 10, wherein the elastic coupling member includes:
an elastic body for providing elasticity; and
a retention unit for preventing the elastic body from being moved.

13. A battery pack, comprising:
a plurality of battery modules, each battery module including a plurality of stacked unit battery cells;
a frame supporting the plurality of battery modules; and
a plurality of elastic coupling members for elastically connecting at least one battery module to another battery module or for elastically connecting at least one of the battery modules to the frame;
wherein:
elastic coupling members connected to the at least one battery module have a different elastic coefficient from elastic coupling members connected to the other battery module,
each of the elastic coupling members includes an elastic body for providing elasticity and a retention unit for preventing the elastic body from being moved,
the retention unit includes a coupling member, the coupling member being inserted in the elastic body and connecting the battery modules to each other and connecting at least one battery module to the frame, and
the coupling member is coupled to the battery modules or the frame by screw threads, and has a bolt head protruding along a circumference thereof.

14. The battery pack as claimed in claim 13, wherein the elastic body is disposed on at least one side of the bolt head.

* * * * *